Figure 1:
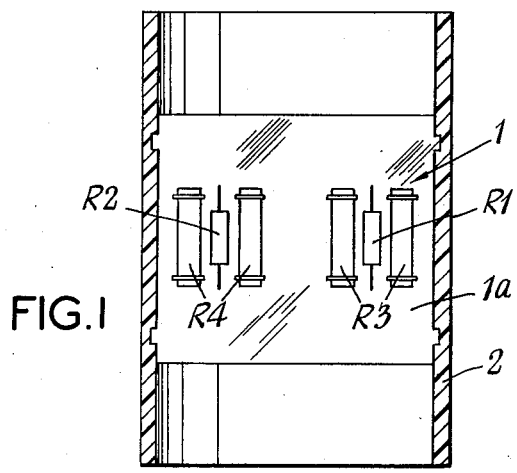

Nov. 30, 1965    G. C. ORAM ET AL    3,220,208
MEANS FOR CONTROLLING THE DEFROSTING OF REFRIGERATING UNITS
Filed March 25, 1963    2 Sheets-Sheet 1

Inventors
Geoffrey Charles Oram,
Stanley Mycroft
by Sommers + Young
Attorneys 3,220,208
MEANS FOR CONTROLLING THE DEFROSTING OF REFRIGERATING UNITS
Geoffrey Charles Oram, Dartford, and Stanley Mycroft, Crayford, England, assignors to J. Stone & Company (Deptford) Limited, London, England
Filed Mar. 25, 1963, Ser. No. 267,458
Claims priority, application Great Britain, Apr. 12, 1962, 14,270/62
3 Claims. (Cl. 62—140)

This invention concerns improvements relating to means for controlling the defrosting of refrigerating units, especially such provided on road vehicles whose cargo is maintained at a low temperature by air circulated over the evaporator tubes of the unit. Frost collecting on these tubes is liable to reduce the rate of heat abstraction from the circulating air and, eventually, to reduce the flow of air, so that effective control of the temperature of the cargo may become no longer possible.

Heretofore, provision has been made to utilize the reduction of the air flow to initiate the defrosting cycle. For this purpose, use has been made of flow-detecting means which incorporate moving parts and these must be so designed as to be capable of withstanding the shocks associated with road-transport vehicles. The present invention seeks to obviate this drawback and to avoid the necessity for using mechanical flow-detecting means.

According to the invention, use is made, as air-flow detecting device of a temperature-sensitive resistor or resistors exposed to the cooling effect of the said air flow. Advantageously, this device may comprise two temperature-sensitive resistors one of which has an electric heater disposed adjacent to it, and means is provided for detecting variation of difference of resistance between the said resistors. The resistors, which may be non-ohmic resistors, may be connected in a bridge circuit.

Preferably, defrosting is arranged to be initiated in response to resistance variation of the resistor or resistors and to be terminated in response to temperature rise at the evaporator.

The two temperature-sensitive resistors may be each disposed similarly in relation to at least one other resistor which, in the case of one of the temperature-sensitive resistors, is connected to a source of heating current so as to serve as the said heater and, in the case of the other temperature-sensitive resistor, is not connected to any external circuit. The two temperature-sensitive resistors may then be connected in a balanced circuit arrangement to a source of alternating current and the primary winding of a transformer in such a manner that there is no output from the secondary winding of the transformer as long as the air flow is sufficient to prevent unbalance due to appreciable heating of the said air temperature-sensitive resistor by the said heater.

A non-linear amplifier may be provided for amplifying the signal furnished by the air-flow detecting device.

A latching circuit may also be provided which is adapted for ensuring that, after defrosting has been terminated in response to temperature rise at the evaporator, further defrosting can be initiated only if the air flow has attained substantially its normal full rate.

Figure 2:
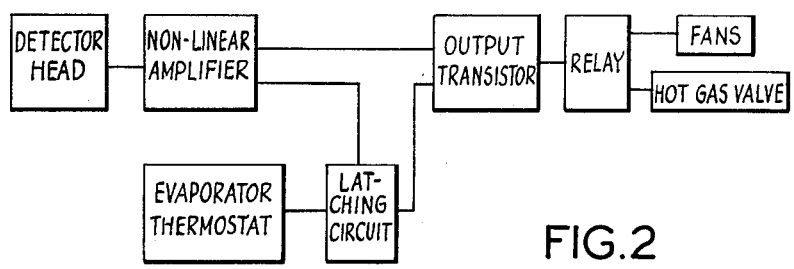

One manner of carrying the invention into effect will now be more fully described by way of example and with reference to the accompanying drawing, in which:
FIGURE 1 is a sectional view of a detector head,
FIGURE 2 a block circuit diagram, and
FIGURE 3 a circuit diagram.

In the example illustrated, the detector head 1 (FIGURE 1), is arranged in the air flow over the evaporator, or generator, of the refrigerating unit of a road vehicle, preferably at a place known to be subject to significant flow reduction as frost accumulates. The head 1 comprises two equal temperature-sensitive non-ohmic resistors R1, R2 with a substantial positive temperature coefficient of resistance, each disposed between a pair of wire-wound ohmic resistors R3, R4 of which one pair, R3, is connected to a supply of current and serves as a heating means, while the other pair, R4, is not connected electrically to any external circuit. The said pairs of resistors, each with its associated non-ohmic resistor, are designed and arranged to form geometrically similar units. The resistors may be mounted upon a printed-circuit board 1a inside a tubular shield 2 of a polyvinyl chloride.

Figure 3:
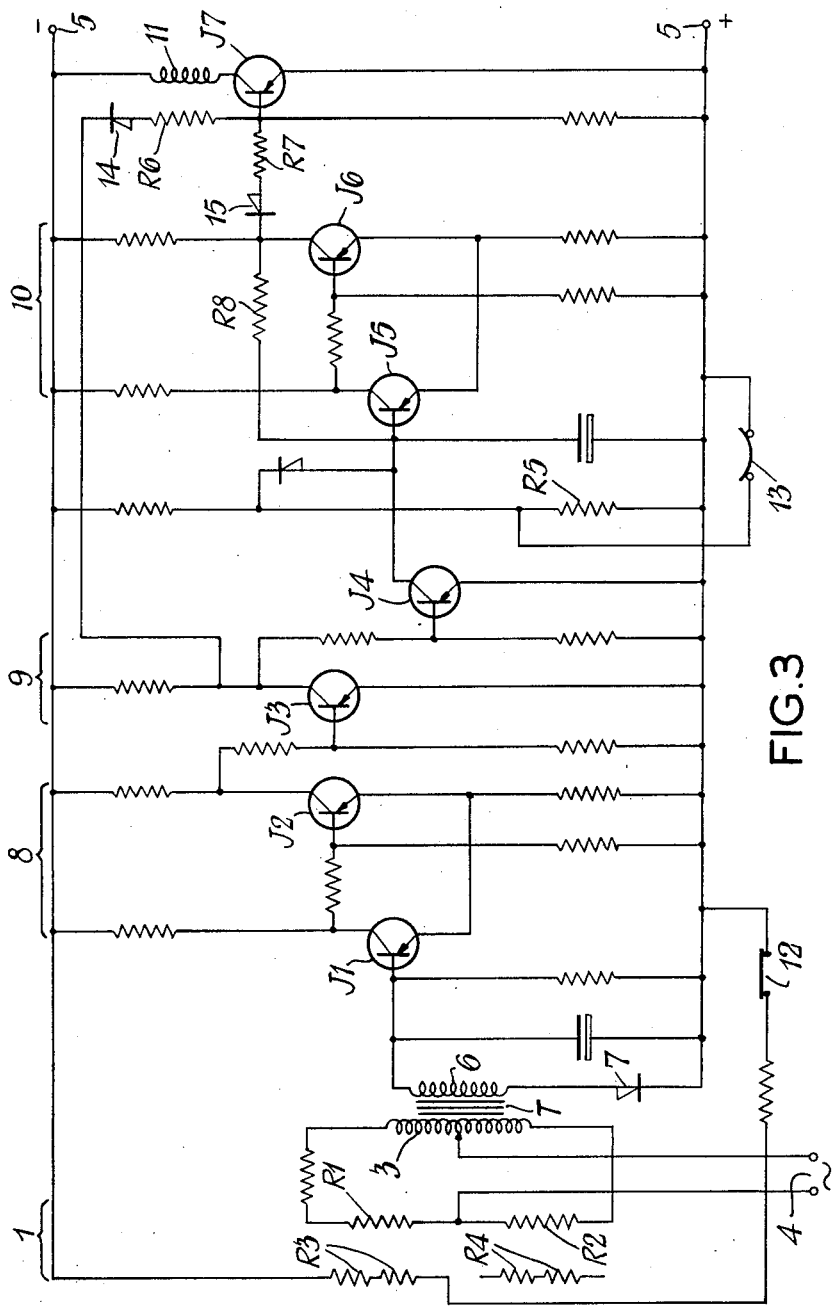

As illustrated in FIGURE 3, the non-ohmic resistors R1, R2 are connected in series across the center-tapped primary winding 3 of a transformer T, a source of alternating current 4 being connected to the center tap on the one hand and the point of connection between the resistors R1, R2 on the other. The ohmic resistors R3 serving as heating means are connected in series across a source of direct current 5, which also serves to supply further circuits to be described below. The resistors R4 are provided to ensure thermally balanced conditions and may simply be connected together in a closed circuit. The output from the secondary winding 6 of the transformer T is passed through a rectifier 7 to the said further circuits. No voltage is induced in the winding 6 as long as the resistance values of the resistors R1, R2, are equal.

The output from the transformer T is supplied to a non-linear amplifier which, as illustrated in FIGURE 3, comprises a known "Schmitt" circuit 8 with transistors J1 and J2, followed by a known phase-reversing circuit 9 with a transistor J3, an intermediate, matching, transistor J4, a latching circuit 10 with transistors J5 and J6, and an output transistor J7. The output side of the transistor J7 is connected in series with the exciting winding 11 of a relay whose normally closed main contacts, not shown, control the operation of a hot-gas valve for effecting defrosting in known manner and the switching off of the fans which produce the aforesaid air flow over the evaporator. The relay also has normally-closed auxiliary contacts 12 in series with the heating resistors R3. A thermostat or temperature-sensitive switch responsive to the temperature of the evaporator, for example embedded in the same, has normally closed contacts 13 which, when closed, short-circuit a resistor R5. These contacts may be arranged to be closed when the evaporator temperature is below 5° C. and to be open when the said temperature is above 20° C.

During normal running, as long as the requisite air flow is present, the said flow will keep the resistor R1 cool, so that the temperatures and resistances of the resistors R1 and R2 will be substantially the same and the bridge circuit constituted by R1, R2 and 3 will be balanced. There will be no output from the secondary winding 6 of the transformer T. In the Schmitt circuit, the transistor J1 will be off and the transistor J2 on. In the reversing circuit, the transistor J3 will be off. The transistor J4 will be on. The output transistor J7 will be on by reason of base current supplied to it through a rectifier 14 and resistor R6. The relay main contacts will be closed so that the fans are energised and the hot-gas valve is closed. The auxiliary contacts 12 will be closed, as also the thermostat contacts 13.

When, however, the air flow falls below a critical value (in a typical case below 300 ft. per min. where the normal flow is 400 ft. per min.) due to ice obstruction, the heating resistors R3 will be able to warm the resistor R1, so that its resistance will rise, the bridge R1, R2, 3 will be thrown out of balance and an output voltage will appear at the secondary winding 6. This voltage serves as a signal for initiating defrosting. In the Schmitt circuit, the transistor J1 will be turned on and the transistor J2 off, while in the reversing circuit the transistor J3 will be on. The transistor J4 will be off. The output transistor J7 will be deprived of base current and will be off, so that the relay will be de-energised, causing the fans to stop and the hot-gas valve to be opened to permit hot gas to traverse and defrost the evaporator. The opening of the auxiliary contacts 12 of the relay will de-energise the heating resistors R3.

The ice causing obstruction to air flow will melt and when defrosting is complete and the temperature of the evaporator has risen to 20° C., the thermostat contacts 13 will open. Due to the de-shunting of the resistor R5, the transistors J5 and J6 in the latching circuit, which have so far been off and on respectively, will now be on and off respectively. Base current will be supplied to the output transistor J7 by way of the rectifier 15 and resistor R7. The transistor J7 will be on and the relay winding 11 re-energised. The gas valve will be closed and the fans and heating resistors R3 switched on again. The contacts 13 will reclose when the evaporator temperature falls to 5° C., but this will have no effect upon the existing on and off conditions of the several transistors. In particular, the latching circuit will remain unaffected, as the transistor J5 will be held on by feed back through the resistor R8. This ensures that cooling by the evaporator will be obtained even if the resistor R1 may not have cooled down completely during the defrosting period, so that unbalance still exists in the bridge circuit R1, R2, 3. Consequently "hunting" between cooling and defrosting is prevented if the frosting is light and the defrosting period is very short.

Due to the re-establishment of normal air flow, the temperature of the resistor R1 will in any case be rapidly reduced and the bridge circuit R1, R2, 3 rebalanced, so that the transistors J1 to J6 will all be reversed, restoring the whole circuit arrangement to its initial condition.

The following tables illustrate typical sequences for light and normal defrosting:

that no defrosting signal is transmitted from the head 1 during initial starting up of the whole refrigerating equipment. Defrosting may be effected by electric heaters near the evaporator instead of by hot gas.

The actual control of the temperature of the cargo of the vehicle may be effected by a temperature controller such as is described in application Serial No. 84,903. In this case, the source of direct current from the temperature controller may serve as the source 5 supplying the heating resistors R3 and the circuits 8–10 and J7. The oscillator of the temperature controller may serve as the source 4 providing the alternating current for the bridge circuit R1, R2, 3.

We claim:

1. In combination with a heat-exchanger subject to frosting, means providing an air-flow circuit in which said heat-exchanger is located, a defrost-control circuit for the said heat-exchanger, apparatus for initiating operation of the said defrost-control circuit in dependance upon the air flow over the said heat-exchanger, said defrost initiating apparatus comprising an air-flow monitoring device comprising two temperature-sensitive resistors arranged in the said air flow, an electric circuit connected to the said resistors and to the said control circuit for detecting variation of difference of resistance between the said resistors, and two further resistors physically identical with each other and similarly situated adjacent to respective ones of said temperature-sensitive resistors in the said air flow, a second source of electric current, means connecting one only of the said further resistors to said other source of current so as to serve as a heater for the temperature-sensitive resistor to which it is adjacent.

2. Apparatus according to claim 1, wherein the said circuit for detecting variation of difference of resistance between the said temperature-sensitive resistors is a Wheatstone bridge circuit in two limbs of which the said

LIGHT DEFROSTING

| Time | Head | Thermostat | Schmitt | | Reversing | | Latching | | Output |
|---|---|---|---|---|---|---|---|---|---|
| | 1 | 13 | J1 | J2 | J3 | J4 | J5 | J6 | J7 |
| Start | Balance | Closed | Off | On | Off | On | Off | On | On |
| 5 hrs | Unbalance | do | On | Off | On | Off | Off | On | Off |
| 5 h., 05 m | do | Open | On | Off | On | Off | On | Off | On |
| 5 h., 09 m | do | Closed | On | Off | On | Off | On | Off | On |
| 5 h., 10 m | Balance | do | Off | On | Off | On | Off | On | On |

NORMAL DEFROSTING

| Start | Balance | Closed | Off | On | Off | On | Off | On | On |
|---|---|---|---|---|---|---|---|---|---|
| 5 hrs | Unbalance | do | On | Off | On | Off | Off | On | Off |
| 5 h., 20 m | do | Open | On | Off | On | Off | On | Off | On |
| 5 h., 22 m | Balance | do | Off | On | Off | On | On | Off | On |
| 5 h., 23 m | do | Closed | Off | On | Off | On | Off | On | On |

It will be seen that defrosting is always initiated by the detector head 1 and defrosting terminated and cooling restarted by the thermostat contacts 13. Cooling is generally held on by the contacts 13 until the head 1 can itself hold on the cooling. However, the cooling will be held on by the latching circuit 10 if the contacts 13 reopen before the head 1 is able to hold on the cooling.

The temperature rise of the resistor R1 with decreasing air flow will be gradual. The presence of the Schmitt circuit ensures, nevertheless, that the initiation of the defrosting and the switching off of the fans will be effected with a snap action.

Various modifications in the above-described arrangement are possible. For example, the non-ohmic resistors R1 and R2 may have negative temperature coefficients of resistance. A bridge rectifier circuit may be interposed between the secondary winding 6 of the transformer T and the Schmitt circuit. If necessary additional amplifying means may precede the output transistor J7. An additional gate-type circuit may be provided to ensure temperature sensitive resistors are respectively connected.

3. Apparatus according to claim 1 and comprising also thermostatic means arranged to respond to temperature rise of the said heat-exchanger and connected to the said control circuit to effect, in response to temperature rise of the said heat-exchanger, the termination of defrosting initiated by the said air-flow monitoring device.

References Cited by the Examiner
UNITED STATES PATENTS

| 2,801,524 | 8/1957 | Fifield | 62—156 |
|---|---|---|---|
| 3,038,106 | 6/1962 | Cutsogeorge et al. | 219—20 |
| 3,040,157 | 6/1962 | Cutsogeorge et al. | 219—20 |
| 3,103,794 | 9/1963 | Kyle et al. | 62—140 |
| 3,107,499 | 10/1963 | Jokela | 62—140 |
| 3,114,025 | 12/1963 | Blauvelt et al. | 219—20 |

ROBERT A. O'LEARY, *Primary Examiner.*